Patented Nov. 4, 1930

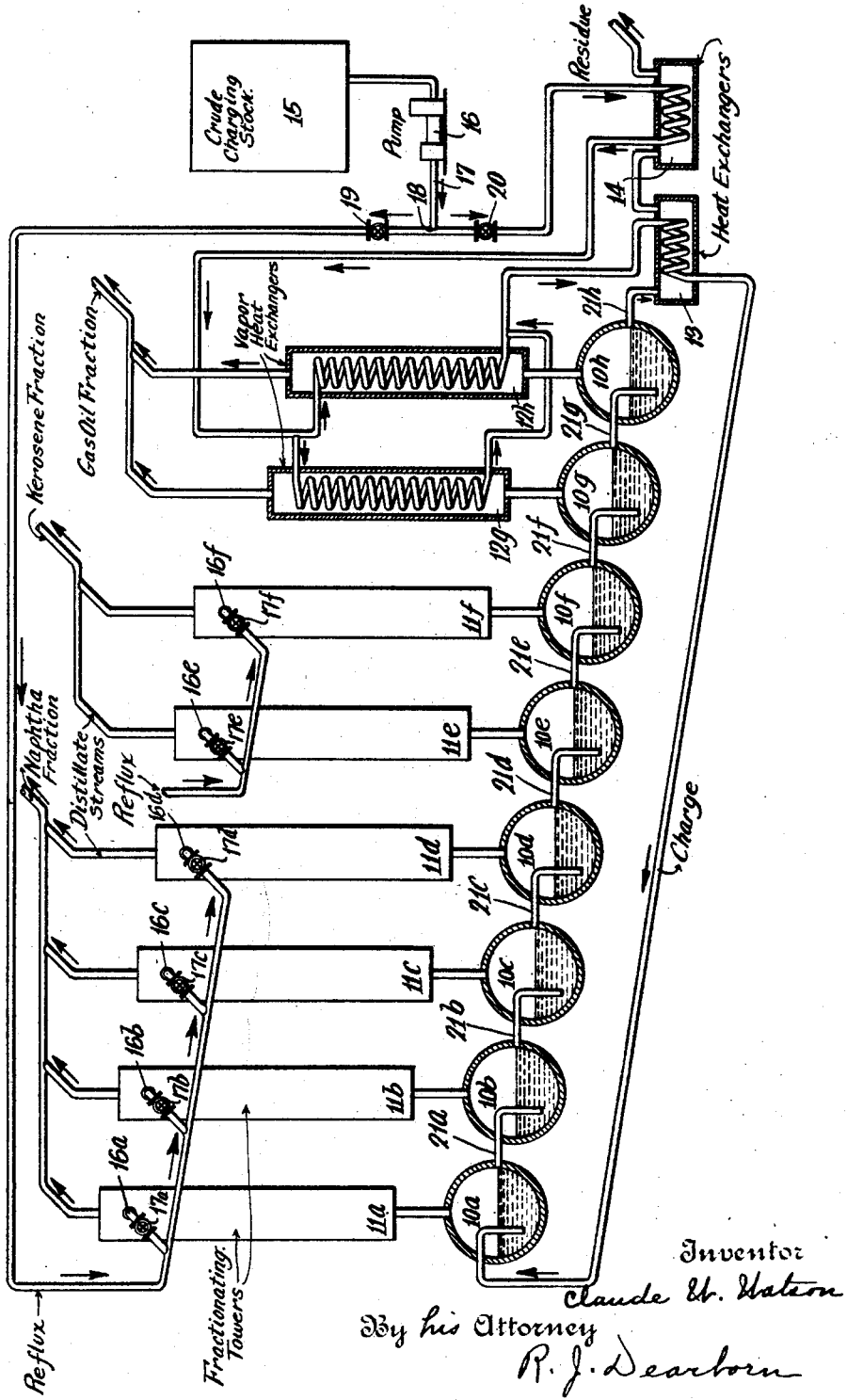

1,780,286

UNITED STATES PATENT OFFICE

CLAUDE W. WATSON, OF PORT ARTHUR, TEXAS, ASSIGNOR TO THE TEXAS COMPANY, OF NEW YORK, N. Y., A CORPORATION OF DELAWARE

TREATING HYDROCARBON OILS

Application filed July 1, 1927. Serial No. 202,782.

This invention relates to a process of fractional distillation particularly adapted for the distillation of petroleum.

The invention relates to the distillation of petroleum or other hydrocarbon oil in a battery of stills fitted with fractionating or rectifying means. The stills are preferably connected in series and arranged to be heated to consecutively increasing temperatures to yield distillates of consecutively increasing boiling points. Part of the charging stock is introduced into the first, that is the lowest temperature still of the battery, to be passed through the other stills in succession, and part of the charge is introduced to the fractionating means of the first still or stills to serve as a reflux or cooling means for the fractionating means.

In the preferred embodiment of the invention each still of the battery, or at least each still of those from which the lighter series of distillates is taken off, is provided with a fractionating or rectifying column and the part of the charge used as a reflux medium is introduced into the upper part of the first fractionating column or columns from which the lightest cut is removed.

In one way of practicing the invention the charging stock is divided into a larger portion and a smaller portion, the larger portion being introduced into the first still and the smaller portion being admitted to the first columns or column to serve as a reflux or cooling medium.

In one method of practicing the invention the oil is subjected to distillation in a battery of stills and charging stock is introduced into that fractionating column, or into those columns, from which it is desired to obtain a distillate or distillates having an initial boiling point approximating, or not materially in excess of, the initial boiling point of the charging stock.

In one aspect of the invention part of the charge, for example a smaller portion, is introduced as a reflux or cooling medium into the fractionating column or columns from which the lighter distillate is taken off while the other part of the charge, as the larger portion, is passed in heat exchange with the other hot products from the stills, such as either the hot residuum or vapors from the last still or stills of the battery, and after being thus preheated is admitted to the first still to be passed through the other stills in succession.

One feature of the invention consists in introducing part of the charging stock into direct contact with vapors evolved in the first still or stills of the battery and utilizing this part of the charge as a reflux medium in the fractionation of the lightest cuts or fractions, while the other portion of the charge is passed in heat exchange, but not into direct contact, with other hot products from the stills, such as residuum drawn off from any of the stills and the vapors from the higher temperature stills.

Under ordinary conditions of fractional distillation of petroleum in connection with the use of modern fractionating columns, it is desirable to supply to the top of the column a certain amount of cool reflux liquid to serve as a cooling medium. In practice, this may be accomplished in a variety of ways, such for example, as returning a portion of the cooled condensate collected from the column to the upper portion thereof, or by placing coils within the upper portion of the column through which is passed a cooling liquid.

By the practice of my invention I am enabled to carry on the fractional distillation of petroleum at a distinct advantage over the conventional method of distillation. This I accomplish by refluxing certain of the fractionating columns of a battery of stills with the cool fresh oil charged to the battery for distillation, rather than with the distillate from the individual columns. Under normal operating conditions in which the distillate from the individual columns is used as reflux a considerable quantity of heat is required to vaporize reflux, which in turn supplies the required cooling to the top of the column. However, in a distillation process carried on in accordance with my invention, wherein the cool charge is used as reflux, the heat absorbed by the reflux in supplying cooling to the column is made to do useful work in distilling off the lighter and more volatile constituents of the reflux liquid itself, the saving and advantages obtained being readily seen.

The invention will be more clearly understood when considered in connection with the accompanying drawing which is a diagrammatic elevation partially in section of apparatus illustrating an example or a particular embodiment of the invention.

Referring to the drawing, reference numerals $10^a$, $10^b$, etc. indicate a battery of eight stills interconnected in series. Stills $10^a$ to $10^f$ inclusive, are fitted with fractionating columns such, for example, as bubble cap columns, represented by the numerals $11^a$, $11^b$, etc. The last two stills in the series, $10^g$ and $10^h$, are fitted with vapor-heat exchangers instead of fractionating columns, the function of these vapor-heat exchangers being more fully described in a later paragraph. The distillation residue from the last still in the series passes through two heat exchangers, 13 and 14, wherein the residue is cooled, its heat being given up to the incoming charge to the battery. A source of crude charge supply is the tank 15 from which the charging stock is pumped by means of the pump 16 to the battery. The fractionating columns $11^a$ to $11^f$ are fitted with connections $16^a$, $16^b$, etc., for the introduction of reflux liquid to the tops of the columns, which is controlled by the valves $17^a$, $17^b$, etc. The vapors from columns $11^a$ to $11^d$, inclusive, are condensed and combined to form the lighter fraction. Vapors from columns $11^e$ and $11^f$ form an intermediate fraction. A heavier fraction is obtained from stills $10^g$ and $10^h$, while the undistilled residue from the final still of the series, $10^h$, is suitable for fuel oil or for the manufacture of heavy lubricating oils, such as cylinder stock.

In operating the process comprising my invention in connection with the apparatus shown in the drawing, I may proceed as follows: The charging stock may consist of any hydrocarbon oil which it is desired to separate into several fractions by means of distillation. Thus, the charging stock may consist of a distillate oil, a residual oil, or a crude petroleum, and in the present description and for the purpose of illustrating the invention, the operation when charging a crude petroleum of the type obtained from the north central Texas fields will be discussed.

The crude petroleum from a source of supply, such as tank 15, is forced to the battery by the pump 16, through the charging line 17, which is divided at the point 18. Thus, the charge is divided into two portions, the relative proportions of which may be regulated by proper manipulation of the valves 19 and 20 and the pump 16. The greater portion of the charge, which I will refer to as charge "A", is forced through the heat exchanger 14 in counter-current with the heated residuum from the final still $10^h$, wherein the charge absorbs heat while cooling the residual oil passing through the exchanger. The partially heated charge "A" then passes through the vapor-heat exchangers $12^g$ and $12^h$ connected in parallel, wherein the charge absorbs additional heat from the gas oil vapors. Finally, the charge "A" passes into the heat exchanger 13 wherein further heat is absorbed from the residual oil from the still $10^h$; from the exchanger 13 the heated charge is pumped to the first still in the series, $10^a$.

The stills $10^a$, $10^b$, etc. are maintained at successively increasing temperatures by means of proper furnaces (not shown) and are interconnected by overflow lines $21^a$, $21^b$, etc. Thus, the charge pumped into the first still of the series, $10^a$, overflows into the second still of the series, $10^b$, and so on through the battery of stills until in passing from the final still of the series, $10^h$, through outlet pipe $21^h$ it passes through the heat exchangers 13 and 14 and thence to storage. As the stills are maintained at successively increasing temperatures the distillation taking place therein produces successively heavier and less volatile fractions as distillates from each of the columns. The vapors produced in stills $10^a$ to $10^d$ inclusive, for example, pass through the columns $11^a$ to $11^d$, wherein they are subjected to fractionation, the fractionated vapors being collected from the upper portions of the columns, and combined to form the naphtha fraction of the crude charge. The vapors from stills $10^e$ and $10^f$ pass through the fractionating columns $11^e$ and $11^f$, wherein they are properly fractionated and are then collected and combined to form the kerosene fraction obtained from the crude charge. The vapors from stills $10^g$ and $10^h$ pass through the vapor-heat exchangers $12^g$ and $12^h$, giving up their heat to the charge "A" and are then collected and combined to form the gas oil fraction of the crude charge.

The course of the larger portion of the charge divided at 18, which was designated as charge "A", has thus been traced. The smaller portion of the charge, which will be designated as charge "B", passes for instance from the point of division 18 to the upper portion of the columns $11^a$, $11^b$, $11^c$, and $11^d$, into which it is introduced through the connections at $16^a$, $16^b$, $16^c$, and $16^d$ to serve as reflux to the said columns. The relative proportion of the charge introduced to the columns will vary in quantity and will be controlled by proper manipulation of valves $16^a$, $16^b$, etc. Thus, the charge "B" is employed for refluxing those columns from which the distillate is obtained which goes to form the naphtha fraction of the original charge. The lighter constituents of the charge "B" may be volatilized and passed out as a part of the naphtha fraction while portions of the charge pass down through the fractionating columns and thence into the stills.

The reflux supplied to columns 11ᵉ and 11ᶠ, from which the kerosene fraction is obtained, does not consist of any portion of the charge due to the fact that the lighter and more volatile constituents of the charge would lower the initial boiling point of the kerosene fraction obtained from these columns. The reflux material employed may be the distillate obtained from the columns or any other material suitable for the purpose and may be introduced to the columns 11ᵉ and 11ᶠ through the connections 16ᵉ and 16ᶠ, the amount being controlled by the valves 17ᵉ and 17ᶠ.

When operated as hereinbefore described, the given battery of stills selected as an example may have a charging capacity of approximately 400 barrels of crude oil per hour, which is divided at the point 18 (see drawing) into the charge "A", consisting of approximately 230 barrels or 57.5 per cent of the total charge, and charge "B" consisting of approximately 170 barrels or 42.5 per cent of the total charge. With the first four stills of the battery maintained at temperatures of approximately 410°, 470°, 500°, and 525° Fahrenheit, respectively, distillate fractions are taken from the top of the corresponding four columns, which portions are combined to make the naphtha or gasoline fraction from the crude charge. However, as has been mentioned before, it is desirable to supply reflux cooling to the columns to accomplish the required fractionation of the vapors and accordingly, the portion of the cool charge, which has been designated as charge "B", is further divided into four separate portions which are introduced into the upper portions of the first four columns. Due to the variations in the temperatures of the individual stills and the corresponding variation in the composition of the vapors entering the columns from the stills the quantity of the crude charge "B" which is introduced into the upper portion of the different columns as reflux is not the same in the case of each column. In the operation of the battery described the introduction of the charge "B" as reflux will be found to be satisfactory when in the following approximate proportions: First column, 80 barrels per hour; second column, 40 barrels per hour; third column, 30 barrels per hour; fourth column, 20 barrels per hour. This distribution of the reflux may be considered as representative of similar battery operations. The yield of naphtha distillate of approximately 400° F. end point and suitable for use as gasoline consisted of approximately 128 barrels per hour or about 32 per cent of the original total charge to the battery. The desirability of using a portion of the cool charge as reflux only to those fractionating columns from which fractions are obtained having an initial boiling point not materially in excess of the initial boiling point of the charge may be observed by reference to the initial boiling points of the fractions collected from the first four columns in the example which has been described. Under the given conditions and with the particular fractionating apparatus used it was found that the initial boiling points (Engler distillation) of the fractions from each of the first four fractionating columns were 115° F., 124° F., 135° F., and 129° F., respectively, while the initial boiling point of the crude charge was 142° F.

The advantages enjoyed in the operations of a battery of stills in accordance with my invention may readily be observed from the above described operations. If the battery were operated in accordance with the usual practice, a portion of the cooled distillate collected from each column would have been returned to that column for the purpose of supplying reflux cooling and under such circumstances the charging capacity of the battery, with the same quantity of fuel consumed, would be far less than that shown when using a portion of the charge as reflux.

By introducing into the first columns charging stock as a reflux or cooling medium containing constituents vaporizable under the conditions obtaining in those columns, a maximum cooling effect is produced with a minimum volume of liquid introduced; and by restricting the introduction of charging stock as a reflux to those columns from which a distillate having an initial boiling point approximating, or not materially in excess of, the initial boiling point of the charging stock and by employing other cooling means for the fractionation or dephlegmation of the vapors from the hotter stills, such for example as another portion of the charging stock in heat exchange but not in direct contact with the vapors, adequate cooling for the separation of the various distillates taken off the battery is secured without contaminating any of the heavier distillates with any liquid of lower boiling point than desired.

In the description of the operation which has been given as an example of an application of the invention, the distillation of a crude petroleum has been outlined, but it is to be understood that the invention is not limited in its application to such material and may advantageously be employed in the fractional distillation of any hydrocarbon oil which is to be separated into two or more fractions. In addition, although the use of a battery of eight stills was described, from which battery four separate fractions of a crude petroleum were obtained, the invention is equally applicable to the operation of a battery of any number of stills in which one or more distillate fractions are separated.

Obviously many modifications and variations of the invention, as hereinbefore set forth, may be made without departing from the spirit and scope thereof, and therefore only such limitations should be imposed as are indicated in the appended claims.

What I claim is:

1. In the fractional distillation of hydrocarbon oils, the process which comprises passing the oil through a battery of series-connected stills provided with fractionating towers wherein the oil is exposed to progressively increasing temperatures, subjecting vapors evolved from the stills to fractionation in the fractionating towers, condensing and collecting vapors evolved from the first several stills of the series whereby a distillate fraction is formed containing the more volatile constituents of the oil charge, dividing the charge into a larger and a smaller portion, introducing the smaller portion as a reflux medium to those fractionating towers corresponding to the stills from which vapors forming said distillate fraction are obtained, and introducing the larger portion of the charge into the first still of the series.

2. In the fractional distillation of crude petroleum, the process which comprises passing the crude oil through a battery of series-connected stills provided with fractionating towers wherein the oil is exposed to progressively increasing temperatures, subjecting vapors evolved from the stills to fractionation in the fractionating towers, condensing and collecting vapors evolved from the first several stills of the series whereby a distillate fraction is formed having a distillation range within the normal distillation range of gasoline, dividing the crude charge into a larger and a smaller portion, introducing the larger portion of the charge into the first still of the series, and introducing the smaller portion as a reflux medium to those fractionating towers corresponding to the stills from which vapors forming said distillate fraction are obtained.

3. In the fractional distillation of hydrocarbon oils, the process which comprises passing the oil through a battery of series-connected stills provided with fractionating towers wherein the oil is exposed to progressively increasing temperatures, subjecting vapors evolved from the stills to fractionation in the fractionating towers, condensing and collecting vapors evolved from the first several stills of the series whereby a distillate fraction is formed containing the more volatile constituents of the oil charge, dividing the charge into a larger and a smaller portion, introducing the smaller portion as a reflux medium to those fractionating towers corresponding to the stills from which vapors forming said distillate fraction are obtained, and introducing the larger portion into heat exchange with other hot products formed in the system, and then passing it through the first still in the series.

In witness whereof I have hereunto set my hand this 22nd day of June, 1927.

CLAUDE W. WATSON.